(12) United States Patent
Tsai et al.

(10) Patent No.: US 8,658,059 B2
(45) Date of Patent: Feb. 25, 2014

(54) LIQUID CRYSTAL COMPOSITE MATERIAL AND LIQUID CRYSTAL ELECTRO-OPTICAL DISPLAY DEVICE

(75) Inventors: Tsung-Yen Tsai, Taoyuan County (TW); Chun-Yi Lee, Taoyuan County (TW); Chen-Ju Lee, Hsinchu (TW); Mu-Yin Lin, Chiayi County (TW); Jui-Ming Yeh, Taoyuan County (TW); Wei Lee, Taoyuan County (TW)

(73) Assignee: Chung Yuan Christian University, Jhongli, Taoyuan County (TW)

( * ) Notice: Subject to any disclaimer, the term of this patent is extended or adjusted under 35 U.S.C. 154(b) by 139 days.

(21) Appl. No.: 13/212,598

(22) Filed: Aug. 18, 2011

(65) Prior Publication Data
US 2012/0162593 A1    Jun. 28, 2012

(30) Foreign Application Priority Data

Dec. 27, 2010    (TW) ................. 99146150 A

(51) Int. Cl.
| | | |
|---|---|---|
| C09K 19/06 | (2006.01) |
| C09K 19/52 | (2006.01) |
| C09K 19/36 | (2006.01) |
| C09K 19/00 | (2006.01) |
| C09K 19/02 | (2006.01) |
| G02F 1/1333 | (2006.01) |

(52) U.S. Cl.
USPC .............. 252/299.6; 252/299.01; 252/299.7; 428/1.1; 349/86; 349/139; 349/182

(58) Field of Classification Search
USPC ............. 252/299.01, 299.6; 428/1.1; 349/86, 349/139, 182
See application file for complete search history.

(56) References Cited

U.S. PATENT DOCUMENTS 6,903,035 B2 *  6/2005  Aono et al. ..................... 501/12
7,625,498 B2 * 12/2009  Tsai et al. ............... 252/299.01

FOREIGN PATENT DOCUMENTS

TW    200630328    9/2006
TW    200829664    7/2008

* cited by examiner

*Primary Examiner* — Geraldina Visconti
(74) *Attorney, Agent, or Firm* — Muncy, Geissler, Olds & Lowe, P.C.

(57) ABSTRACT

A liquid crystal composite material and a liquid crystal electro-optical display device are provided. A liquid crystal composite material, includes: a liquid crystal; a polymer; and a modified inorganic layered material, wherein the modified inorganic layered material is formed by modifying an inorganic layered material with a conjugated oligomer, and the conjugated oligomer has a quaternary ammonium group or sulfonate group.

16 Claims, 3 Drawing Sheets

LIQUID CRYSTAL COMPOSITE MATERIAL AND LIQUID CRYSTAL ELECTRO-OPTICAL DISPLAY DEVICE

CROSS REFERENCE TO RELATED APPLICATIONS

This application claims priority of Taiwan Patent Application No. 099146150, filed on Dec. 27, 2010, the entirety of which is incorporated by reference herein.

BACKGROUND OF THE INVENTION

1. Field of the Invention

The present invention relates to a liquid crystal composite material, and in particular relates to a liquid crystal composite material having an inorganic layered material.

2. Description of the Related Art

A switchable glass, also called a smart glass, is a particular kind of glass for decorating a building, wherein a liquid crystal layer is disposed inside the glass. The liquid crystal is used to alter light transmittance of the glass by electric voltage, such that the glass can be switched from being transparent to opaque. Recently, the switchable glass has been widely used in different sectors such as the office, building, hospital, housing, machine room, and aerospace sector. Also, switchable glass can be used as a projector screen.

The light transmittance of switchable glass is typically modulated by a polymer-dispersed liquid crystals therein. When an electrical field is applied, molecules of liquid crystal droplets rotate and align, such that the refractive indices of the liquid crystal and polymer match, permitting light to pass through the glass. When no electrical field is applied, the liquid crystals are arranged in random orientations, such that light is scattered, so that the switchable liquid crystal glass looks translucent.

Conventionally, the liquid crystal layer used in a switchable glass is a polymer-dispersed liquid crystal film (PDLC film). A problem with the conventional polymer-dispersed liquid crystal film is its poor light resistance, which results in poor opacity. In order to improve the contrast ratio of the polymer-dispersed liquid crystal film, an increase in film thickness is usually required. However, this increase in film thickness will also increase the driving voltage of the liquid crystals.

The refractive indices of the liquid crystal and the polymer must match to allow the PDLC film to become transparent when a voltage is applied. Therefore, the materials of the polymer and liquid crystals cannot be changed arbitrarily. Carbon-based inorganic compounds such as carbon tubes and carbon capsules, or layered materials are commonly used as additives to reduce the driving voltage of the device, instead of changing manufacturing processes. The above inorganic compounds may be $TiO_2$, $SiO_2$, or ZnO, for example. The layered material may be such as natural clay. In Taiwan patent application No. 200829664, a single layer of carbon nanotubes is proposed to improve the transmittance and reduce the electrical resistance thereof. However, the reduction of the driving voltage is still unsatisfactory, and therefore the applications of switchable glasses are still limited (for example, the driving voltage is still too high for implementation in the automobile industry.)

In addition, in Taiwan patent application No. 200630328; a conductive liquid crystal material is used to reduce the electrical resistance of the device. However, the polymers are required to be charged to accommodate the refraction index of the conductive liquid crystals. Likewise, if the polymers are replaced by conductive polymers, the liquid crystals also need to accommodate the refraction index of the polymers. Therefore, it is difficult to integrate this method into existing processes.

Thus, a novel method that can reduce the driving voltage of the polymer-dispersed liquid crystal device to broaden its applications without altering the existing process is required.

BRIEF SUMMARY OF THE INVENTION

An embodiment of the invention provides a liquid crystal composite material, including: a liquid crystal; a polymer; and a modified inorganic layered material, wherein the modified inorganic layered material is formed by modifying an inorganic layered material with a conjugated oligomer, and the conjugated oligomer has a quaternary ammonium group or sulfonate group.

Another embodiment of the invention provides a liquid crystal electro-optical display device, including: a first substrate having a first electrode thereon, disposed oppositely to the first substrate; a second substrate having a second electrode thereon, wherein the first substrate and the second substrates are disposed opposite to each other; and the previously described liquid crystal composite material disposed between the first substrate and the second substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
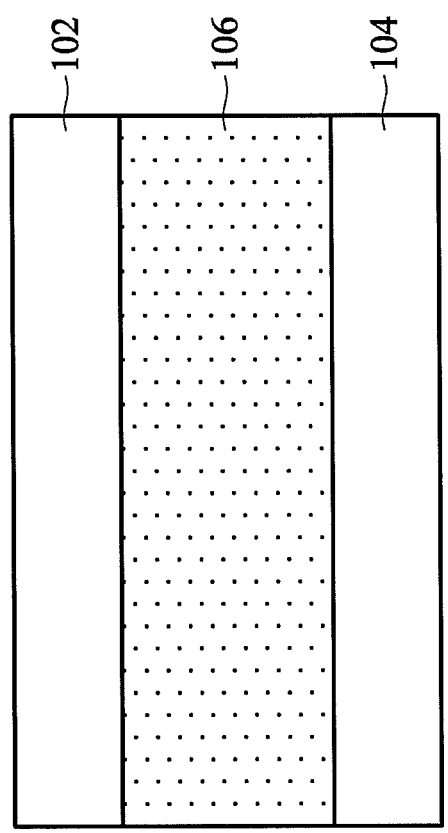
FIG. 1 is an electro-optical liquid crystal display device according to one embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

In one embodiment, a novel liquid crystal composite material is provided. The liquid crystal composite material can reduce a driving voltage of an electro-optical liquid crystal display and shorten its transient electro-optical response time.

In one embodiment, the liquid crystal composite material may include liquid crystals, polymers, and a modified inorganic layered material. Suitable liquid crystals may include nematic liquid crystals, smectic liquid crystals, or cholesteric liquid crystals. The polymers suitable for use herein may include photocurable acrylic resins, such as acrylic acid resin, epoxy acrylate, urethane acrylate, polyester acrylate, or other polymers having refraction indices which match with the liquid crystals.

The modified inorganic layered material is obtained by modifying an inorganic layered material with a conjugated oligomer. The inorganic layered material may include cation exchange clay or anion exchange clay. In one embodiment, the inorganic layered material suitable for use herein may include, but are not limit to, smectite clay, vermiculite, halloysite, sericite, mica, or combinations thereof. Suitable smectite clay may include montmorillonite, saponite, beidellite, nontronite, hectorite, or combinations thereof. A cation exchange capacity (CEC) of the inorganic layered material may be between 50 meq/100 g and 200 meq/100 g. Liquid such as deionized water, distilled water, ethanol, or ethanol derivatives may be used for swelling clay, with a ratio of 1:25 to 1:50 (clay:liquid.)

The conjugated oligomers for modifying the inorganic layered material may include, but are not limited to, anthracene derivatives, anthraquinoline derivatives, imidazole derivatives, triphenylamine and its derivatives, thiophene derivatives, styrene derivatives, oxadiazole derivatives, or combinations thereof. As used herein, the anthracene derivatives may include 2,6-bis[2-(4-pentylphenyl)vinyl]anthracene. The imidazole derivatives may include poly-p-phenylenebenzobismidazole. The triphenylamine derivatives may include 4,4'-dinitro-4"-(dimethylamino)triphenylamine. The thiophene derivatives may include poly(3,4-propylenedioxythiophene). The styrene derivatives may include poly(styrene sulfonic acid). The oxadiazole derivatives may include 2,5-diphenyly-1,3,4-oxadiazole. Note that the derivatives described above are merely examples for the purpose of illustration, and these examples do not limit the scope of the invention. The conjucated oligomers for modifying the inorganic layered material may further bear a quaternary ammonium group or a sulfonate group, such that the modified inorganic layered material is capable of ion exchange.

Molecular weight of the conjugated oligomers may be less than 10,000. If the molecular weight of the conjucated oligomers is too large, the entropy (randomness) of the system will be too large. Therefore, the molecular weight of the conjucated oligomers is preferably less than 3000. In one embodiment, a degree of polymerization (DP) of the conjucated oligomers may be between 3 and 30.

In one embodiment, the inorganic layered material is modified by the quaternary ammonium group or the sulfonate group of the conjugated oligomers. In one embodiment, under an acidic condition, the —$NH_2$ of the conjugated oligomers transforms to —$NH_3^+$, such that the quaternary ammonium cation can undergo ion exchange with sodium ions in the inorganic layered material. Therefore, the conjugated oligomers can enter the inorganic layered material, thereby forming the modified inorganic layered material.

In one embodiment, the modified inorganic layered material may contain at least about 0.05 wt % of the conjugated oligomer. In addition, the liquid crystal composite material may contain less than 10 wt % of the modified inorganic layered material, preferably between 0.01 wt % and 7 wt %. In one embodiment, a thickness of the liquid crystal composite material may be less than about 5 μm. In another embodiment, the liquid crystal composite material may further include a solvent, a surfactant, or combinations thereof. The electro-optical liquid crystal display device of the invention may be a polymer-dispersed liquid crystal, a switchable liquid crystal glass, or a twisted nematic liquid crystal.

FIG. 1 illustrates an electro-optical liquid crystal display device according to one embodiment of the invention. The electro-optical liquid crystal display device includes a pair of substrates 102 and 104 disposed opposite to each other. Each of the substrates 102 and 104 has an electrode, and the liquid crystal composite material is disposed between the two substrates 102 and 104. The substrates 102 and 104 may be conductive materials or conductive polymers, such as ZnO, Pt, Indium tin oxide (ITO), fluorine-doped tin oxide (FTO), or the like. An orientation layer or a polarizing layer may also be disposed on a front side or on a back side of the substrates 102 and 104 when required, without affecting the function of the device.

A problem with the conventional polymer-dispersed liquid crystal device is that the polymers used are not conductive, and therefore the device requires a high driving voltage. In addition, a refraction index of the polymers must match with the optical anisotropy of the liquid crystal, such that, by adjusting the voltage, the refraction index of the liquid crystal can be altered to change the light transmittance of the device. Conventionally, the polymers are replaced by conductive polymers to reduce the electrical resistance. As a result, replacement of new liquid crystals having a refraction index matching with the new conductive polymers is also required. However, the polymer and the liquid crystal are not miscible. Therefore, processes for manufacturing the polymer-dispersed liquid crystal device need to be redesigned when the liquid crystals and the polymers are changed.

The modified inorganic layered material of the invention can be added to the liquid crystal composite material without altering the existing manufacturing process. Due to affinity effect, the polymerization rate of the polymers in the modified liquid crystal can be increased. Moreover, the conjugated bonds of the modified inorganic layered material can facilitate transference of electrons. Thus, the conductivity of the polymers can be improved without replacement with other polymers and affecting the refraction index of the polymer, while still reducing the driving voltage. In one embodiment, the driving voltage may be between, but not limited to 0.5V and 20V.

Since the driving voltage is reduced, the liquid crystal composite material can be used in more applications. For example, it can be used as a switchable liquid crystal glass in the automobile industry. An automobile can only provide direct current (DC), so the highest applicable voltage of an automobile is still insufficient for driving the liquid crystal of conventional switchable liquid crystal glass. (For example, the driving voltage for the conventional liquid crystal device may be higher than 50V.) However, the driving voltage of the switchable liquid crystal glass having the modified inorganic layered material may be lower than 20V. Therefore, the switchable liquid crystal glass according to the invention can be suitable for the automobile industry.

Furthermore, in the polymer-dispersed liquid crystal system, the liquid crystals having the modified inorganic layered material can increase alignment speed of the liquid crystals due to resist an anchoring force. Conventionally, a potential difference between two electrodes induces the liquid crystals to rotate and align, and therefore the alignment speed is slow. However, the modified inorganic layered material having electrical charges will align faster under the potential differences. When the modified inorganic layered material is aligned, it will also drive the liquid crystals to align. Therefore, the transient electro-optical response time is reduced. In one embodiment, the transient electro-optical response time may be between about 0.004 ms and 5 ms, but it is not limit thereto. Furthermore, after adding the modified inorganic layered material, sizes of the liquid crystal droplets become larger, and phase separation between the liquid crystals and the polymers will become more obvious, such that the contrast ratio and transparency of the glass are improved.

Example 1

In the example, inorganic materials were modified under various pH values. Penta-oligomer-aniline (POA) was used as a conjugated polymer to modify the inorganic layered materials.

Solution A was prepared as followed. 0.3 g of natural clay NTC-C34 (China Glaze Co. LTD, $Ca_{0.30678}Na_{0.07426}(Al_{3.312}Mg_{0.688})Si_8O_{20}(OH)_4$) was added into D.I. water to completely swell the clay. The weight ratio between the natural clay and D.I. water was between 1:25 and 1:50. A cation exchange capacity (CEC) of the natural clay was 168 meq/100 g.

Solution B was prepared as followed. The amount of the penta-oligomer-aniline used was 0.6 to 2 times that of the cation exchange capacity of the natural clay. D.I. water with sulfuric acid was used to adjust a pH value of the solution, wherein, the —$NH_2$ group of the penta-oligomer-aniline was transformed to —$NH_3^+$ to form a quaternary ammonium salt.

The solution A and the solution B were mixed. The mixture was mechanically stirred (450 rpm) for 24 hours to help the penta-oligomer-aniline intercalate to inside of the swelled clay. The mixture is called solution C hereafter.

The solution C was washed by ethanol and was high-speed centrifuged for a few times. The penta-oligomer-aniline which did not react with the clay was removed. After centrifuging and lyophilization (at −20° C., about 0.005 torr) to remove the extra ethanol, a dried modified inorganic layered material was then mechanically milled to powdered form, to form a modified inorganic layered clay having a conjugated structure (NTC-C34/POA).

The powders of the inorganic layered clay with or without modification under various pH values were analyzed by an x-ray diffraction spectrometer. The characteristic peak (001) of the inorganic layered clay powder not modified (NTC-C34) was $2\theta=7.00°$, and its d-spacing was 12.61 Å. When the pH value was between 0 and 2, the characteristic peak (001) of the modified inorganic layered clay powder was $2\theta=5.83°$, and its d-spacing was 15.16 Å, which showed intercalated dispersion. When the pH value was between 2 and 3, the characteristic peak (001) of the modified inorganic layered clay powder shifted leftward into the background was lower than $2\theta=5.83°$, and its d-spacing were larger than 28.97 Å, which showed delaminated dispersion. When the pH value was between 3 and 4, the characteristic peak (001) of the modified inorganic layered clay powder was $2\theta=3.22°$, and its d-spacing was 27.44 Å.

The example illustrates the modification of the inorganic layered clay under various pH values. When the modification was performed under a pH of 0 to 3, the inorganic layered clay showed intercalated dispersion, exfoliated dispersion, or combinations thereof. It should be noted that the inorganic layered clay can not be exfoliated completely, as the inorganic layered clay would likely lose its electrical double layered feature or the steric hindrance of organic molecules in the layered clay. When the pH value was lower than 2, the conjugate oligo-aniline transformed from a nonconductive emeraldine base to a conductive emeraldine salt. Therefore, the modification of the inorganic layered clay was preferably performed or re-protonized under a pH equal to 0 to 2, such that it would be transformed to the conductive emeraldine salt to reduce the driving voltage.

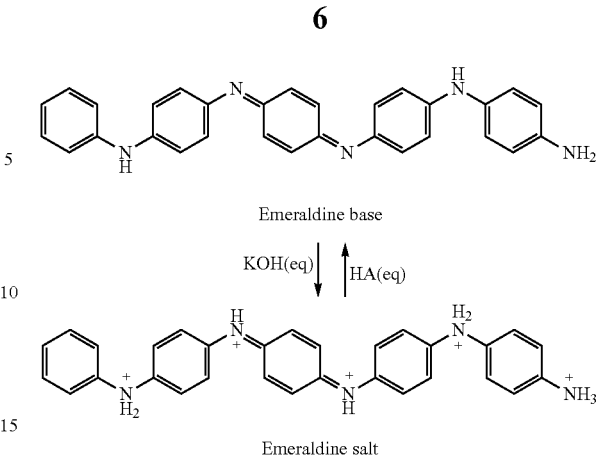

Example 2

The example illustrated transmittances and driving voltages of electro-optical liquid crystal display devices having modified inorganic layered clay.

The modified inorganic layered clay (pH=0 to 2) of example 1, liquid crystal E7 (Merck), and polymers NOA65 (Norland Optical Adhesive 65, Alderich) were mixed. The mixture was heated and injected into a cell (a gap between the cell was 12 μm, and polyimide (PI) at 180° orientation was used.) Then, the mixture was exposed to ultraviolet light of 365 nm such that the NOA65 was polymerized and separated with the liquid crystals to form liquid crystal droplets. Epoxy resin was used to seal the injection opening, thus, forming an electro-optical liquid crystal display device. A He—Ne laser ($\lambda=632.8$ nm) was used as the light source to detect the laser intensity that passed through the samples.

Figure 2:
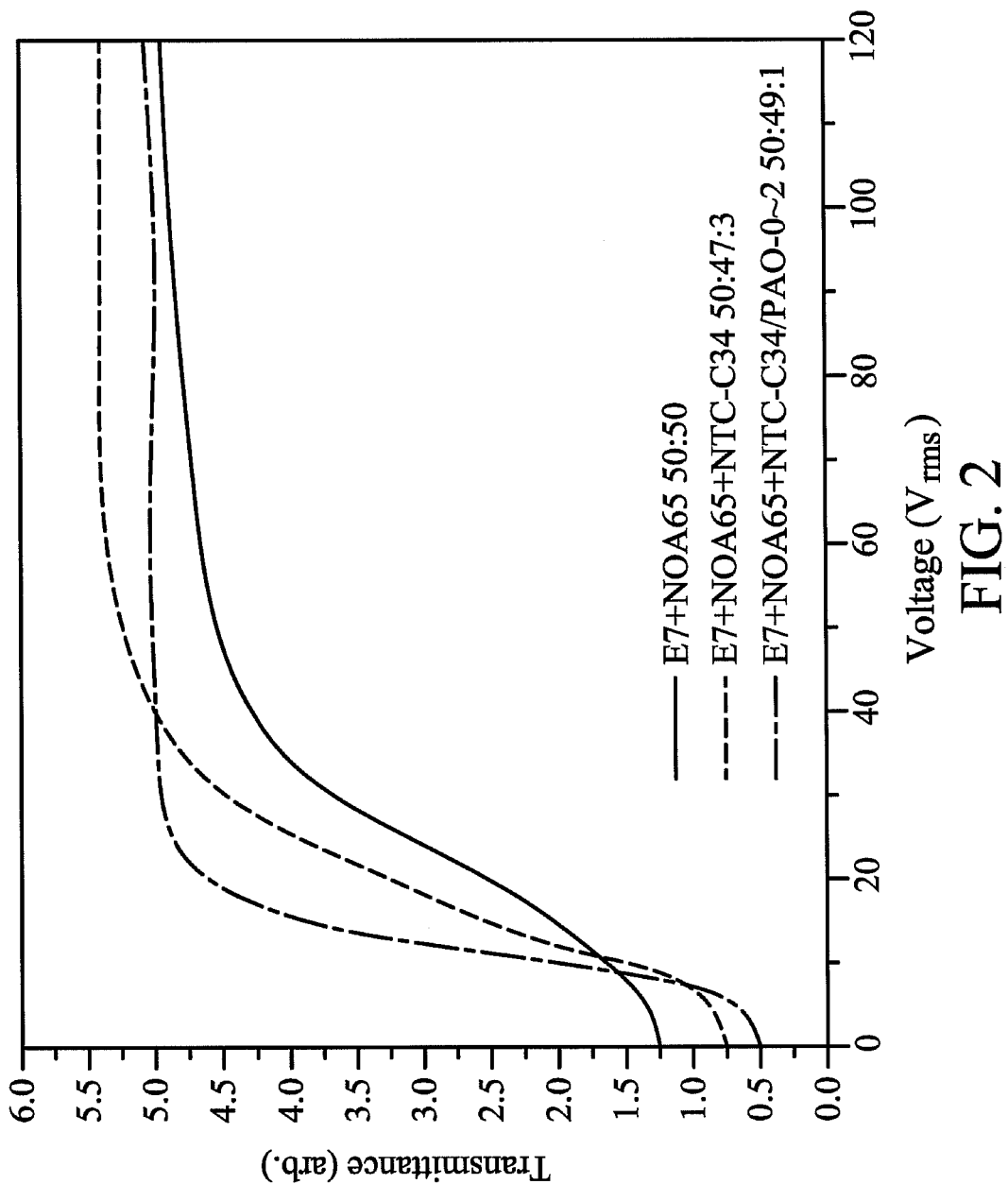
FIG. 2 illustrates a relationship between transmittance and voltage of an electro-optical liquid crystal display device according to one embodiment of the invention.

FIG. 2 illustrates a relationship between the transmittance and the voltage of the electro-optical liquid crystal display device. The Curve a represents the device having only 50 wt % of the E7 and 50 wt % of the NOA65 (E7+NOA65). The Curve b represents the device having 50 wt % of the E7, 47 wt % of the NOA65, and 3 wt % of the inorganic layered clay which was not modified (E7+NOA65+NTC-C34). The Curve c represents the device having 50 wt % of the E7, 49 wt % of the NOA65, and 1 wt % of the modified inorganic layered clay (E7+NOA65+NTC-C34/PAO 0-2).

As shown in Table 1, with a 3 wt % of the inorganic layered clay which was not modified, a driving voltage of the device dropped 25.75 $V_{rms}$. However, with only a 1 wt % of the modified inorganic layered clay, the driving voltage of the device dropped 43.87 $V_{rms}$.

TABLE 1

| Sample | 90% Transmittance (abs) (Actual transmittance) | Driving voltage ($V_{rms}$) |
|---|---|---|
| E7 + NOA65 50:50 | 4.68 (74.28) | 64.93 |
| E7 + NOA65 + NTC-C34 50:47:3 | 4.98 (79.04) | 39.18 |
| E7 + NOA65 + NTC-C34/POA 0-2 50:49:1 | 4.72 (74.88) | 21.06 |

In addition, referring to FIG. 1, after the addition of the modified inorganic layered clay, a contrast ratio of the electro-optical liquid crystal display device increased. The contrast ratio was defined as follows.

$$\text{Transmittance Contrast ratio} = \frac{\text{Maximum transmittance}}{\text{Minimum transmittance}}$$

Referring to FIG. 2, the contrast ratio of the device having inorganic layered clay which was not modified was 3.6 (4.5: 1.25). The contrast ratio of the device having modified inorganic layered clay was 10 (5.0:0.5). Therefore, adding the modified inorganic layered clay into the device not only reduced the driving voltage but also increased the transmittance. Moreover, the liquid crystal contrast ratio was improved in on and off states, thereby providing better performance. Moreover, the liquid crystal contrast ratio was improved in on and off states, thereby providing better performance.

Example 3

The example illustrated transmittances and driving voltages of electro-optical liquid crystal display devices having modified inorganic layered clay under various pH values.

The natural clay NTC-C34 was modified by penta-oligomer-aniline at pH values of 0 to 2 or pH values of 2 to 3 following the procedures described in Example 1. 0.5 wt % of the modified inorganic layered clay, 50 wt % of the liquid crystals E7, and 49.5 wt % of NOA65 were mixed following the procedures described in Example 2. The mixture was heated and injected into the cell. Then, after the mixture was exposed to ultraviolet light and sealed, the electro-optical liquid crystal display device was formed.

Referring to Table 2, the driving voltage of the device at the pH of 0 to 2 was reduced to 35.59 $V_{rms}$. The driving voltage of the device at the pH of 2 to 3 was reduced to 29.85 $V_{rms}$. Therefore, the modification of the inorganic layered clay can be performed at a pH equal to 0 to 3, preferably at a pH equal to 0 to 2.

TABLE 2

| Sample | 90% Transmittance (abs) (Actual transmittance) | Driving voltage ($V_{rms}$) |
|---|---|---|
| E7 + NOA65 50:50 | 4.68 (74.28) | 64.93 |
| E7 + NOA65 + NTC-C34/POA-pH 2.0-3.0 50:49.5:0.5 | 5.16 (81.90%) | 35.08 |
| E7 + NOA65 + NTC-C34/POA-pH 0-2 50:49.5:0.5 | 4.86 (77.14%) | 29.34 |

Example 4

The example illustrated transient electro-optical response times of electro-optical liquid crystal display devices. In the example, the definition of the transient electro-optical response time was defined as a required time of a device switched from an initial off state (10% transmittance) to a saturated state (90% transmittance).

Figure 3:
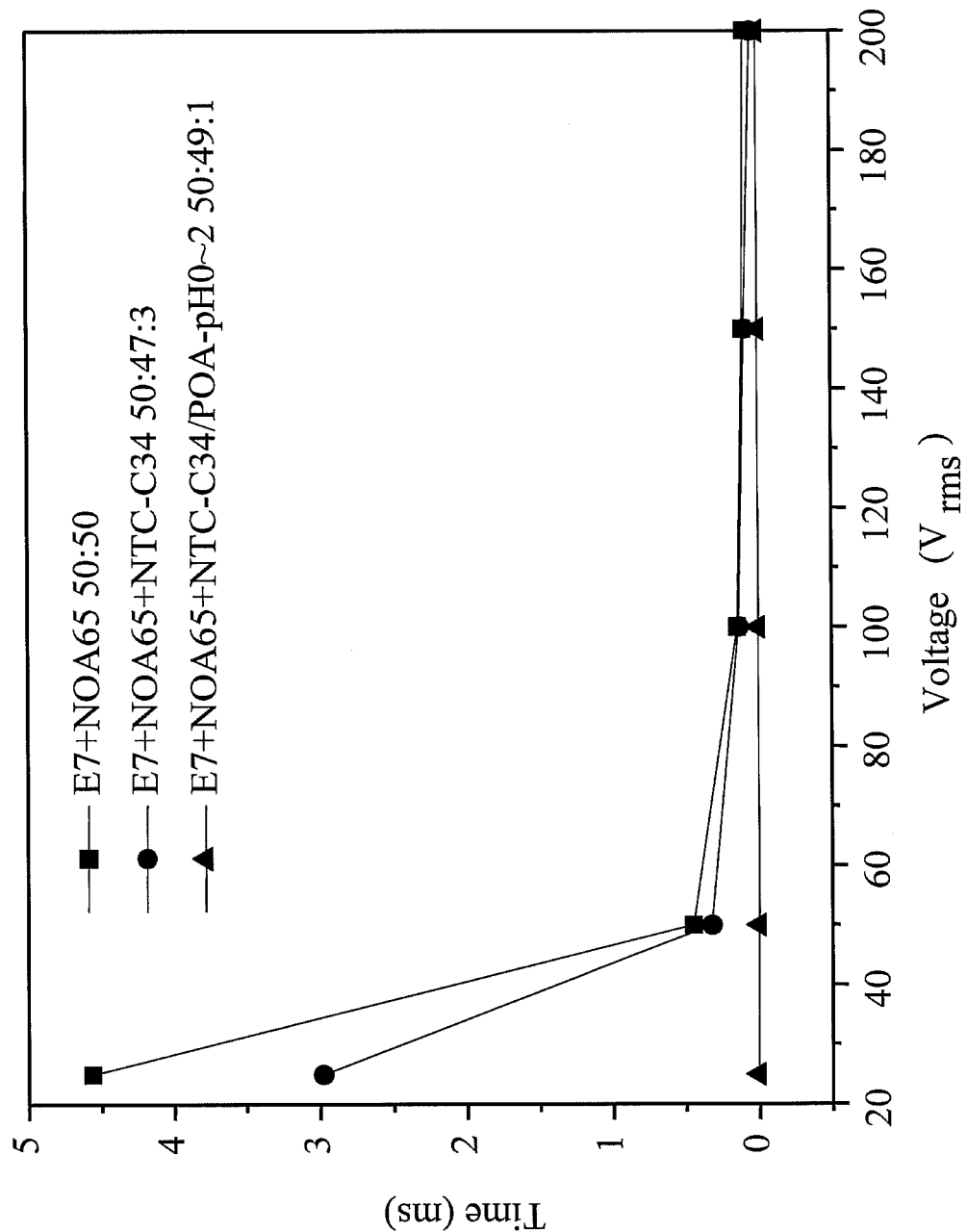
FIG. 3 illustrates response times of an electro-optical liquid crystal display devices under different voltage according to one embodiment of the invention.

FIG. 3 showed the response times at various voltages. The Curve a represents the device having only 50 wt % of the E7 and 50 wt % of the NOA65 (E7+NOA65). The Curve b represents the device having 50 wt % of the E7, 47 wt % of the NOA65, and 3 wt % of the inorganic layered clay which was not modified (E7+NOA65+NTC-C34). The Curve c represents the device having 50 wt % of the E7, 49 wt % of the NOA65, and 1 wt % of the modified inorganic layered clay (E7+NOA65+NTC-C34/POA 0-2).

Referring to Table 3, under 25 $V_{rms}$, the response time of the device having inorganic layered clay which was not modified decreased 1.6 ms, and the response time of the device having modified inorganic layered clay (pH=0-2) decreased 3.9 ms. The response time that the liquid crystal of the device having modified inorganic layered clay required to transform from 10% transmittance to 90% transmittance took only 0.004 ms. Therefore, the modified inorganic layered clay of the invention can solve the delay problem by improving the response time of the liquid crystal display device.

TABLE 3

| Sample | 25 $V_{rms}$ response time |
|---|---|
| E7 + NOA65 50:50 | 4.6 |
| E7 + NOA65 + NTC-C34 50:47:3 | 3.0 |
| E7 + NOA65 + NTC-C34/POA-pH 0-2.0 50:49.5:1 | 0.004 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal composite material, comprising
   a liquid crystal;
   a polymer; and
   a modified inorganic layered material, wherein the modified inorganic layered material is formed by modifying an inorganic layered material with a conjugated oligomer, and the conjugated oligomer has a quaternary ammonium group or sulfonate group.

2. The liquid crystal composite material as claimed in claim 1, wherein the liquid crystal comprises a nematic liquid crystal, a smectic liquid crystal, or a cholesteric liquid crystal.

3. The liquid crystal composite material as claimed in claim 1, wherein the polymer comprises a photocurable resin, wherein the refraction index of the liquid crystal is matched with the photocurable resin.

4. The liquid crystal composite material as claimed in claim 1, wherein the inorganic layered material comprises a cation exchange clay or an anion exchange clay.

5. The liquid crystal composite material as claimed in claim 1, wherein the inorganic layered material comprises a smectite clay, a vermiculite, a halloysite, a sericite, a mica, or combinations thereof.

6. The liquid crystal composite material as claimed in claim 5, wherein the smectite clay comprises a montmorillonite, a saponite, a beidellite, a nontronite, a hectorite, or combinations thereof.

7. The liquid crystal composite material as claimed in claim 1, wherein a conjugate structure of the conjugated oligomer comprises an anthracene group, imidazole group, triphenylamine group, thiophene group, styrene group, oxadiazole group, or combinations thereof.

8. The liquid crystal composite material as claimed in claim 1, wherein a molecular weight of the conjugated oligomer is less than about 10,000.

9. The liquid crystal composite material as claimed in claim 1, wherein the modified inorganic layered material comprises at least about 0.05 wt % of the conjugated oligomer.

10. The liquid crystal composite material as claimed in claim 1, wherein the liquid crystal composite material comprises less than 10 wt % of the modified inorganic layered material.

11. The liquid crystal composite material as claimed in claim 1, further comprising a solvent, a surfactant, or combinations thereof.

12. A liquid crystal electro-optical display device, comprising
 a first substrate having a first electrode thereon, disposed oppositely to the first substrate;
 a second substrate having a second electrode thereon, wherein the first substrate and the second substrates are disposed opposite to each other; and
 a liquid crystal composite material as claimed in claim 1 disposed between the first substrate and the second substrate.

13. The liquid crystal electro-optical display device as claimed in claim 12, wherein a transient electro-optical response time of the liquid crystal electro-optical display device is between 0.004 and 5 ms, which is 60% lower than a counterpart device in absence of the modified inorganic layered material.

14. The liquid crystal electro-optical display device as claimed in claim 12, wherein a driving voltage of the liquid crystal electro-optical display device is between 0.5 and 20V, and the driving voltage of the liquid crystal electro-optical display device is 40% lower than a counterpart device in absence of the modified inorganic layered material.

15. The liquid crystal electro-optical display device as claimed in claim 12, wherein a size of the inorganic layered material is less than about 5 μm.

16. The liquid crystal electro-optical display device as claimed in claim 12, which is used in a polymer dispersed liquid crystal device, a smart liquid crystal glass device, or a twisted nematic liquid crystal device.

* * * * *